(12) United States Patent
Byers et al.

(10) Patent No.: US 8,795,600 B2
(45) Date of Patent: Aug. 5, 2014

(54) UV DISINFECTION SYSTEM

(75) Inventors: Matthew E. Byers, Lawrenceburg, KY (US); John McFarland, Guston, KY (US); Charlie Carrol, Louisville, KY (US); Adrian France, Louisville, KY (US); Andy Westphal, Bedford, KY (US); Jason Nett, Floyds Knobs, IN (US)

(73) Assignee: Zoeller Pump Company, LLC, Louisville, KY (US)

( * ) Notice: Subject to any disclaimer, the term of this patent is extended or adjusted under 35 U.S.C. 154(b) by 608 days.

(21) Appl. No.: 12/393,766

(22) Filed: Feb. 26, 2009

(65) Prior Publication Data
US 2010/0215553 A1    Aug. 26, 2010

(51) Int. Cl.
| | | |
|---|---|---|
| *B01J 19/08* | (2006.01) | |
| *C02F 3/12* | (2006.01) | |
| *C02F 1/32* | (2006.01) | |
| *C02F 3/30* | (2006.01) | |

(52) U.S. Cl.
CPC ........... C02F 1/325 (2013.01); *C02F 2201/326* (2013.01); *C02F 2201/3223* (2013.01); *C02F 2209/40* (2013.01); C02F 3/1242 (2013.01); *C02F 2209/42* (2013.01); C02F 3/30 (2013.01)
USPC ...................... 422/186.3; 422/24; 210/748.01; 210/748.1; 250/504 R

(58) Field of Classification Search
CPC .......... C02F 1/325; C02F 3/1242; C02F 3/30; B01J 19/123; A61L 2/10
USPC .................. 422/186.3, 24; 210/748.01, 748.4; 250/504 R
See application file for complete search history.

(56) References Cited

U.S. PATENT DOCUMENTS

| | | | |
|---|---|---|---|
| 3,672,823 A | | 6/1972 | Boucher |
| 4,292,175 A | * | 9/1981 | Krause et al. ................. 210/192 |
| 5,208,461 A | | 5/1993 | Tipton |
| 5,471,063 A | | 11/1995 | Hayes et al. |
| 5,725,757 A | * | 3/1998 | Binot ................................ 210/85 |
| 5,780,860 A | | 7/1998 | Gadgil et al. |
| 5,840,196 A | | 11/1998 | Laurent |
| 6,217,760 B1 | * | 4/2001 | Bovington ................. 210/195.1 |
| 6,296,775 B1 | | 10/2001 | Moody et al. |
| 6,403,030 B1 | | 6/2002 | Horton, III |
| 6,461,520 B1 | * | 10/2002 | Engelhard et al. ........ 210/748.12 |
| 6,683,313 B2 | | 1/2004 | Chen et al. |
| 7,241,380 B2 | | 7/2007 | Reiling |
| 7,250,610 B1 | | 7/2007 | Cox et al. |
| 7,279,092 B2 | | 10/2007 | Moody et al. |

(Continued)

OTHER PUBLICATIONS

Kloppenberg, specification of U.S. Appl. No. 61/078,587, filed Jul. 7, 2008.*

(Continued)

*Primary Examiner* — Xiuyu Tai
(74) *Attorney, Agent, or Firm* — Wyatt, Tarrant & Combs, LLP; Stephen C. Hall

(57) ABSTRACT

A UV Disinfection System is provided comprising a wastewater treatment device in combination with a UV treatment device. Multiple embodiments provide that the UV treatment device is contained substantially within the wastewater treatment device. Embodiments include those wherein the UV treatment device is substantially vertically oriented and extends downward from an outlet shared by the wastewater treatment device and the UV treatment device, thereby requiring all flow exiting the wastewater treatment device to pass through the UV treatment device.

34 Claims, 17 Drawing Sheets

(56) References Cited

U.S. PATENT DOCUMENTS

| | | | |
|---|---|---|---|
| 7,343,794 B1* | 3/2008 | Pucel et al. ............... | 73/215 |
| 7,371,323 B1 | 5/2008 | Spielman et al. | |
| 7,391,041 B2 | 6/2008 | Sajo et al. | |
| 2004/0004044 A1 | 1/2004 | Anderson | |
| 2004/0050429 A1* | 3/2004 | Aylward et al. ............ | 137/597 |
| 2005/0145563 A1* | 7/2005 | Boyd et al. ................. | 210/601 |
| 2006/0159814 A1* | 7/2006 | Forney et al. .............. | 426/335 |
| 2007/0284315 A1 | 12/2007 | Collins et al. | |
| 2008/0000844 A1* | 1/2008 | Ralph ......................... | 210/760 |
| 2008/0006583 A1* | 1/2008 | Perry et al. ................. | 210/746 |
| 2008/0173651 A1* | 7/2008 | Ping ........................... | 220/581 |

OTHER PUBLICATIONS

Hill P.E., Ronald and Succow June; "O&M with UV disinfection"; Magazine; Summer 2000; pp. 1-8; vol. 30; No. 2; USA.

Solomon, Clement; Casey, Peter; Mackne, Colleen, and Lake, Andrew; "Ultraviolet Disinfection"; Fact Sheet; Environmental Technology Initiative; No. WWFS0M20; pp. 1-4; 1998; National Small Flows Clearinghouse; USA.

USEPA Office of Water; "Decentralized Wastewater Treatment Systems—A Program Strategy"; Publication; Jan. 2005; pp. 1-14; Environmental Protection Agency; USA; http://www.epa.gov/owm/septic/pubs/septic_program_strategy.pdf.

Leverenz, Harold; Darby, Jeannie; Tchobanoglous, George; "Evaluation of Disinfection Units for Onsite Wastewater Treatment Systems"; Report; University of California, Davis Center for Environmental and Water Resources Engineering; Jan. 2006, No. 2006-1; pp. 1-44; USA; http://www.swrcb.ca.gov/water_issues/programs/owts/docs/disinfection.pdf.

United States Environmental Protection Agency; "Wastewater Technology Fact Sheet: Disinfection for Small Systems"; Sep. 1999; pp. 1-10; Fact Sheet; USA; http://water.epa.gov/infrastructure/septic/upload/disinfection_small.pdf.

United States Environmental Protection Agency; "Wastewater Technology Fact Sheet: Ultraviolet Disinfection"; Sep. 1999; pp. 1-7; Fact Sheet No. EPA 832-F-99-064; USA; http://water.epa.gov/scitech/wastetech/upload/2002_06_28_mtb_uv.pdf.

United States Environmental Protection Agency; "Report to Congress on Use of Decentralized Wastewater Treatment Systems"; 1997, pp. 1-101; USA; water.epa.gov/infrastructure/septic_rtc_all.pdf.

* cited by examiner

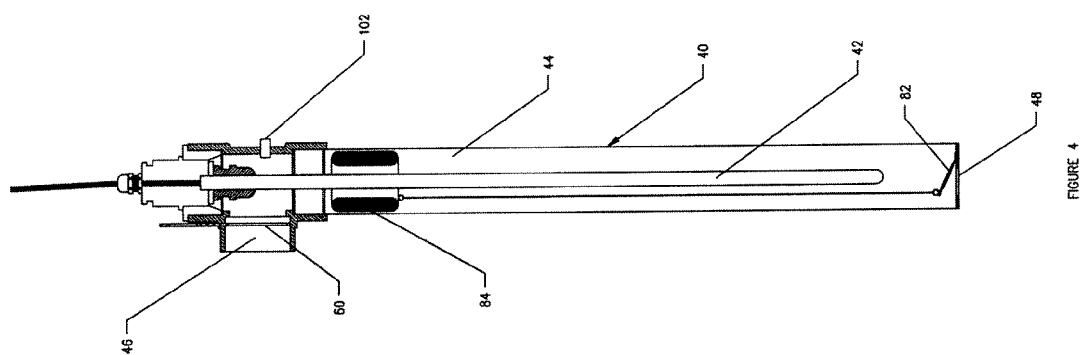

UV DISINFECTION SYSTEM

BRIEF DESCRIPTION OF THE DRAWINGS

FIG. 4 is a side elevation view of a UV treatment device according to multiple embodiments and alternatives;

The following terms, as may be found or used hereinafter in both the specification and the claims, shall be understood to be open terms wherein the use of such terms does not exclude additional, unrecited elements: include, includes, including, have, has, having, contain, contains, containing, comprise, comprises, comprising, further comprise, further comprises, and further comprising.

BACKGROUND AND SUMMARY

Wastewater treatment is the process of removing impurities from wastewater. An objective of wastewater treatment is to produce a stream of treated effluent suitable for discharge or reuse back in the environment. Wastewater treatment may comprise primary treatment, secondary treatment, and/or tertiary treatment. Primary treatment can involve the use of septic tanks to separate solids, fats, oils, greases and produce primary effluent. Secondary treatment may be used to substantially degrade the impurities contained in the wastewater fluid. In further detail, wastewater treatment comprises performing the functions of biochemical oxygen demand ("BOD") and total suspended solids ("TSS") removal and reduction.

Jokaso devices represent one form of wastewater treatment device and are suitable for use with the present embodiments and alternatives. Typical Jokaso devices include those having five functional chambers. The first chamber works as a trash tank under anaerobic condition much like a septic tank. The second chamber is typically filled with filter media for anaerobic biofilm filtration process. The third chamber is also filled with filter media but kept aerobic by dispersing compressed air. The fourth chamber works as a buffer storage tank for the treated water. The last chamber is for disinfection purposes (sometimes referred to as tertiary treatment).

A final step in wastewater treatment is the disinfection of the treated effluent in order to substantially reduce the number of impurities in the effluent to be discharged back into the environment. UV light disinfection represents one wastewater disinfection method. Shortwave UV light, wavelength between 230 nm and 270 nm, typically around 254 nm, destroys microorganisms by causing molecular rearrangements in its DNA and RNA. This blocks replication and the ability to form colonies. Compared to other substances, water can be an excellent transmitter of UV light.

DETAILED DESCRIPTION OF MULTIPLE EMBODIMENTS AND ALTERNATIVES

Figure 1:
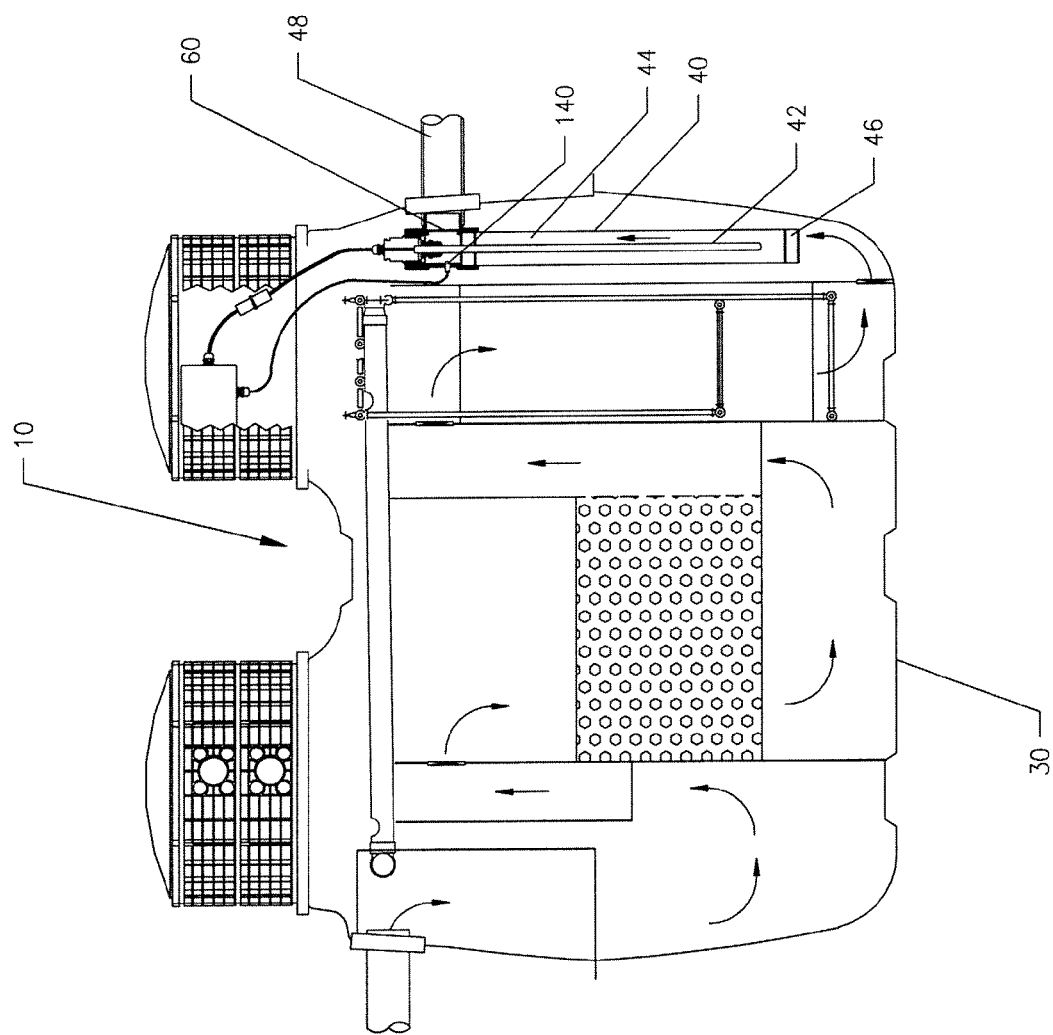
FIG. 1 is a side elevation view of a wastewater treatment system showing a wastewater treatment device and a UV treatment device according to multiple embodiments and alternatives.
Figure 1A:
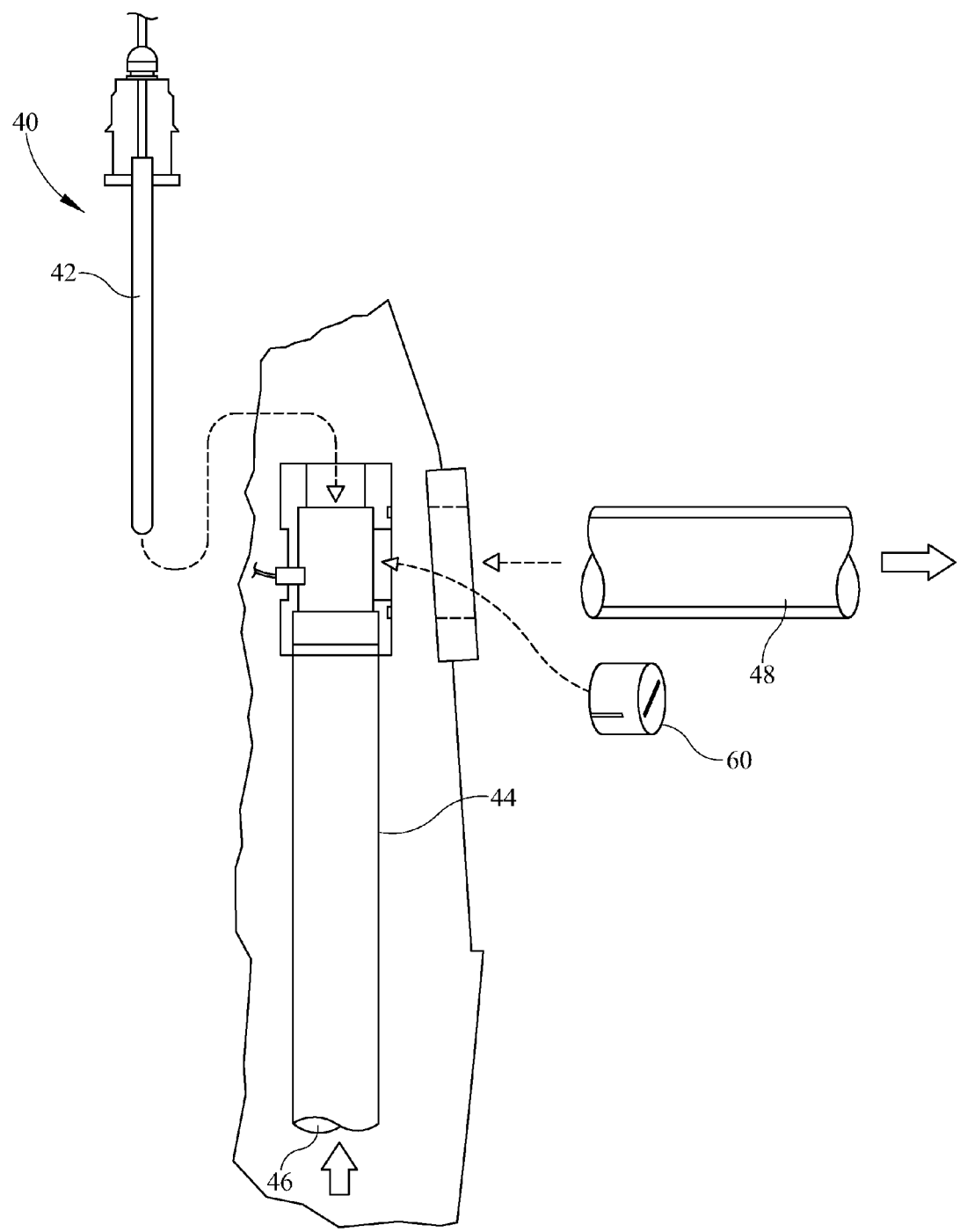
FIG. 1A is an exploded view of a portion of the wastewater treatment system of FIG. 1 having a wastewater treatment device and a UV treatment device, which shows the UV treatment device in the wastewater treatment device and the shared outlet between the wastewater treatment device and the UV treatment device, according to multiple embodiments and alternatives.

Multiple embodiments and alternatives are provided for a UV Disinfection System designed to treat wastewater. A first embodiment of a wastewater treatment system 10 comprises a wastewater treatment device 30 with a UV treatment device 40 contained substantially within the wastewater treatment device 30 as shown generally in FIG. 1.

Figure 2:
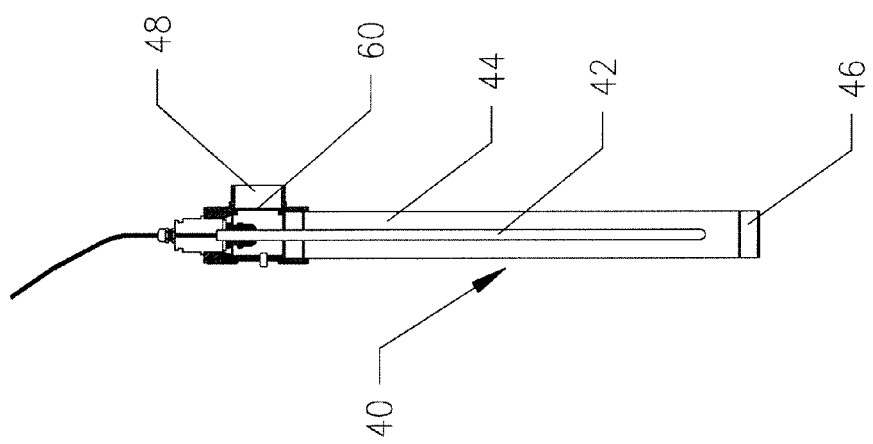
FIG. 2 is a side elevation view of a UV treatment device according to multiple embodiments and alternatives.

The fluid flow through the UV treatment device 40 is positive displacement flow. Alternatively, the fluid flow through the UV treatment device 40 is initiated by any of a number of different methods, as desired, including, but not limited to, flow initiated by a pump, pressurized flow or any other means for initiating fluid flow as selectably chosen by a user. As shown in FIG. 2, and in further detail, the UV treatment device 40 includes a UV light source 42 within a UV treatment device housing 44 through which fluid flows through the UV treatment device 40. Suitable UV light sources 42 are well known in the industry and are available through a number of suppliers including those manufactured and distributed by Salcor, Inc. The UV treatment device 40 also includes a housing inlet 46 and a housing outlet 48. With reference back to FIG. 1, in multiple embodiments wherein the UV treatment device 40 is contained substantially within the wastewater treatment device 30, the UV treatment device 40 and the wastewater treatment device 30 share the housing outlet 48. In some embodiments, the UV treatment device 40 is substantially vertically oriented with respect to the ground and extends downward from the housing outlet 48. Embodiments include those wherein the housing inlet 46 is located deeper in the vertical plane than the housing outlet 48. The housing inlet 46 has an opening that facilitates the entry of fluid and further allows solids to fall out of the UV treatment device housing 44. In some embodiments, the housing inlet 46 is baffled in order to help prevent UV light from escaping the UV treatment device 40. Multiple embodiments include a configuration where all flow exiting the wastewater treatment device 30 must pass through the UV treatment device housing 44 of the UV treatment device 40. The UV treatment device 40, being vertically oriented, is substantially simple to maintain from the surface access provided by wastewater treatment device 30.

Figure 3:
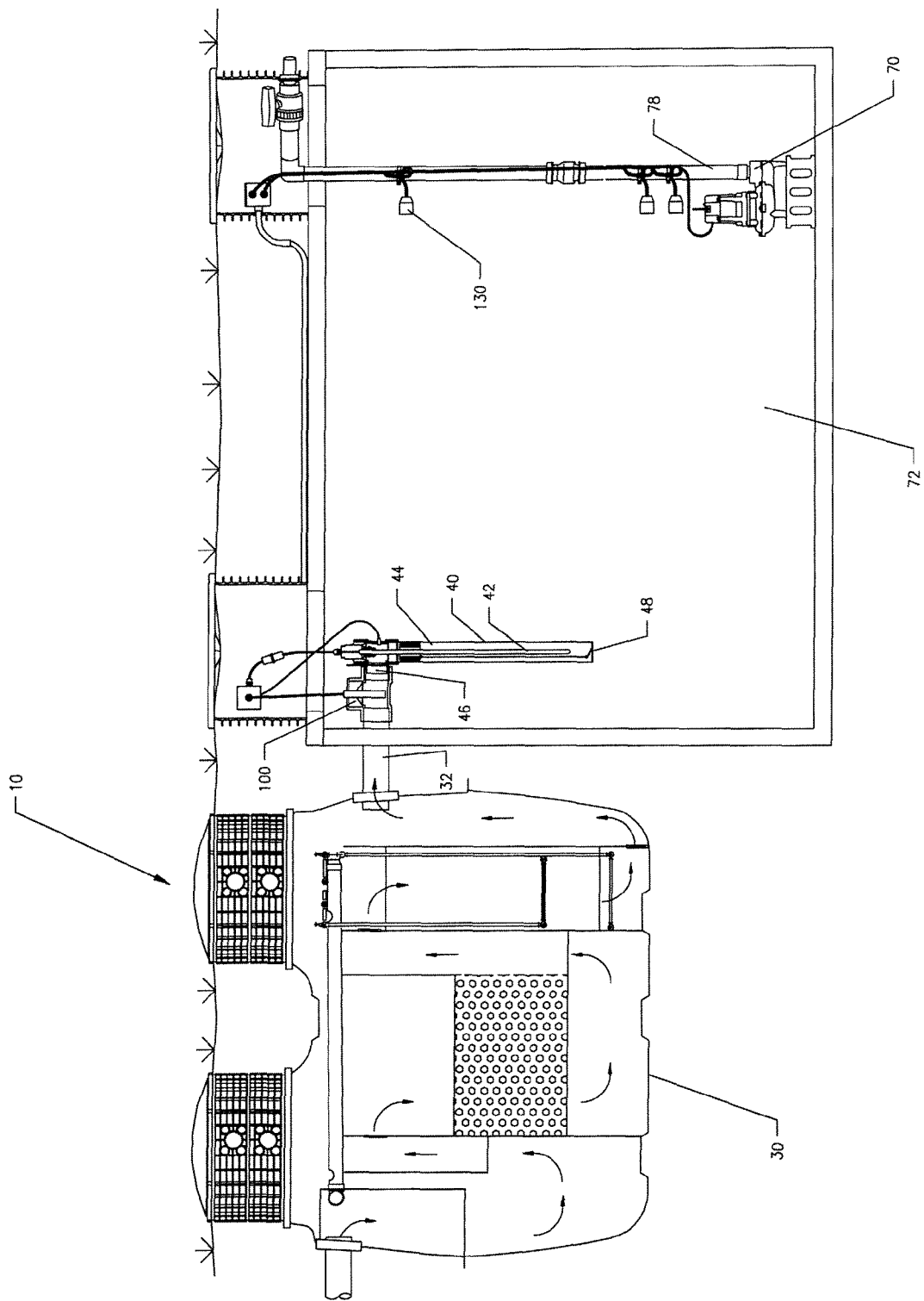
FIG. 3 is a side elevation view of a wastewater treatment system according to multiple embodiments and alternatives.

An alternative embodiment of the wastewater treatment system 10 comprises a wastewater treatment device 30 as shown in FIG. 3. Multiple embodiments include a UV treatment device 40 located in a discharge destination, which consists of a pump chamber 72 or a pumping basin 74; however, the UV treatment device 40 is located, as desired, at any point deemed suitable by the user. Embodiments include the pump chamber 72 and the pumping basin 74 composed substantially of concrete, plastic or fiberglass; but the pump chamber 72 and the pumping basin 74 are composed, as desired, of any material deemed suitable by the user. The UV treatment device 40 includes a UV light source 42 within a UV treatment device housing 44. The UV treatment device 40 further includes a housing inlet 46 and a housing outlet 48. The wastewater treatment device 30 includes a discharge outlet 32 disposed on the wastewater treatment device 30 such that the discharge outlet 32 allows fluid to exit the wastewater treatment device 30 and enter the housing inlet 46.

Figure 4D:
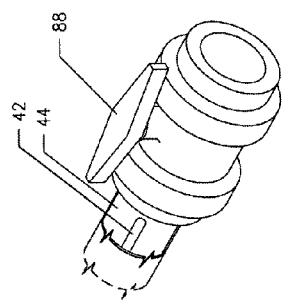
FIG. 4d is a perspective view of a UV treatment device according to multiple embodiments and alternatives.
Figure 4C:
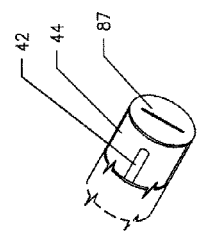
FIG. 4c is a perspective view of a UV treatment device according to multiple embodiments and alternatives.
Figure 4B:
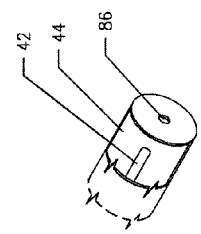
FIG. 4b is a perspective view of a UV treatment device according to multiple embodiments and alternatives.
Figure 4A:
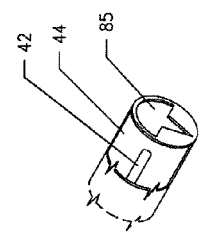
FIG. 4a is a perspective view of a UV treatment device according to multiple embodiments and alternatives.

In multiple embodiments, the housing outlet 48 discharges fluid into the pump chamber 72 or pumping basin 74, thereby allowing the fluid to flow substantially vertically downward, with respect to the ground, into the pump chamber 72 or pumping basin 74. In some embodiments, the UV treatment device 40 also includes a discharge mechanism which controls the flow out of the UV treatment device 40. With reference to FIG. 4, multiple embodiments of the UV treatment device 40 include a discharge mechanism that comprises a flapper valve 82 actuated by a float 84 disposed in the UV treatment device housing 44. The flapper valve 82 retains effluent within the UV treatment device housing 44 until the UV treatment device housing 44 is filled to a desired level, at which time the effluent is discharged to the pump chamber 72 or pumping basin 74. With reference to FIG. 4a, multiple embodiments of the UV treatment device 40 include a discharge mechanism that comprises a weir 85. With reference to FIG. 4b, multiple embodiments of the UV treatment device 40 include a discharge mechanism that comprises a hole 86. With reference to FIG. 4c, multiple embodiments of the UV treatment device 40 include a discharge mechanism that comprises a slit 87. With reference to FIG. 4d, multiple embodiments of the UV treatment device 40 include a discharge mechanism that comprises a ball valve 88. However, the discharge mechanism includes other means for discharging deemed suitable by the user.

Figure 5:
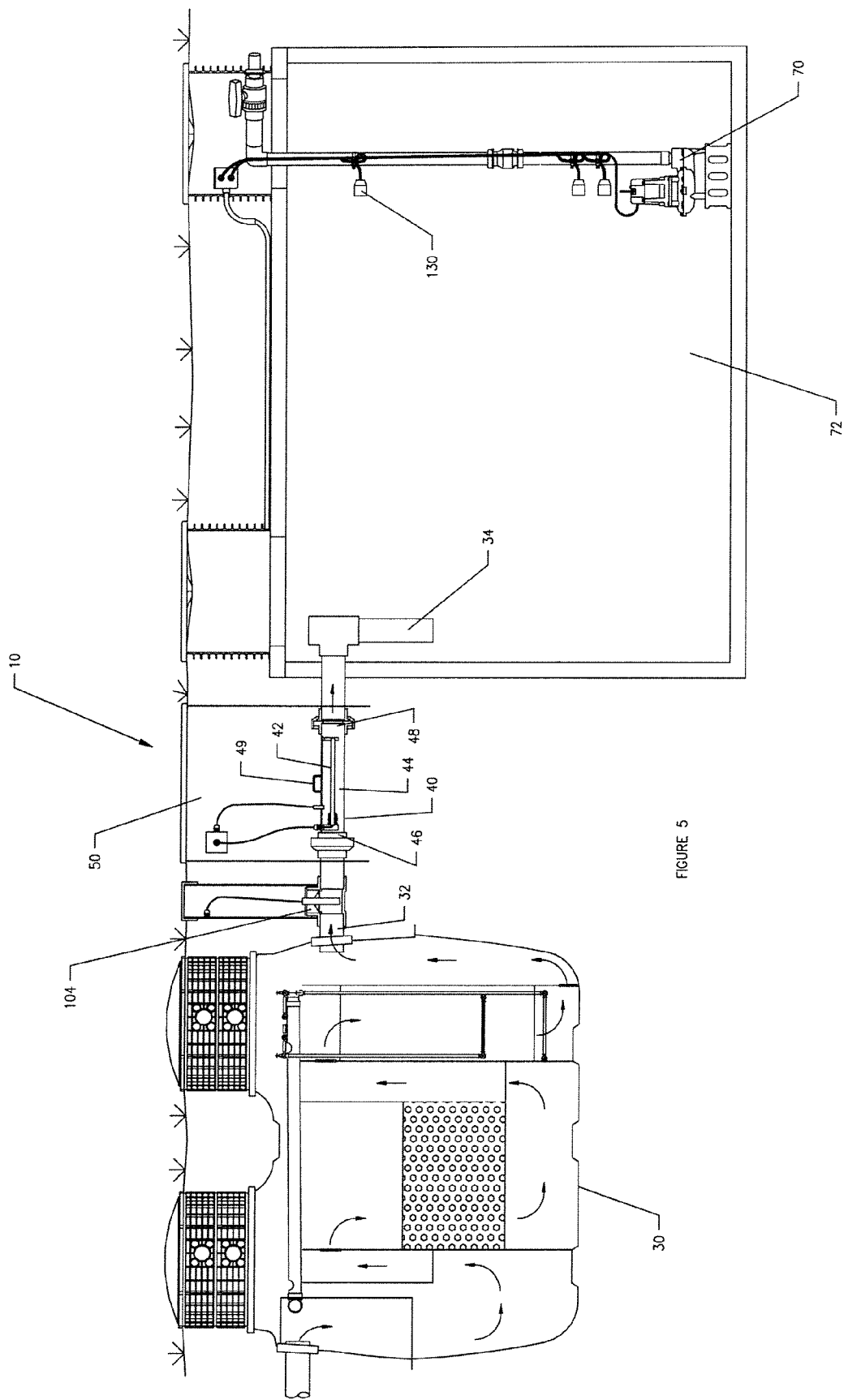
FIG. 5 is a side elevation view of a wastewater treatment system according to multiple embodiments and alternatives.

Another alternative embodiment of a wastewater treatment system 10 comprises a wastewater treatment device 30 and a discharge outlet 32 as shown generally in FIG. 5. The wastewater treatment system 10 includes an effluent outlet 34. The wastewater treatment system 10 further includes a UV treatment device 40. The UV treatment device 40 includes a UV light source 42 within a UV treatment device housing 44. In multiple embodiments, the UV treatment device 40 further includes a housing inlet 46, a housing outlet 48 and a top cover 49. The discharge outlet 32 allows fluid to exit the wastewater treatment device 30 and enter the housing inlet 46. The housing inlet 46 is disposed on the UV treatment device housing 44 such that the housing inlet 46 allows fluid to enter the UV treatment device housing 44. The housing outlet 48 is disposed on the UV treatment device housing 44 such that the housing outlet 48 allows fluid to exit the UV treatment device housing 44 and enter the effluent outlet 34. The effluent outlet 34 discharges fluid to a pump chamber 72 or a pumping basin 74. Multiple embodiments include those wherein the UV treatment device 40 is located substantially within the pump chamber 72 or the pumping basin 74. Alternatives include those wherein the UV treatment device 40 is disposed in a housing chamber 50.

Figure 6:
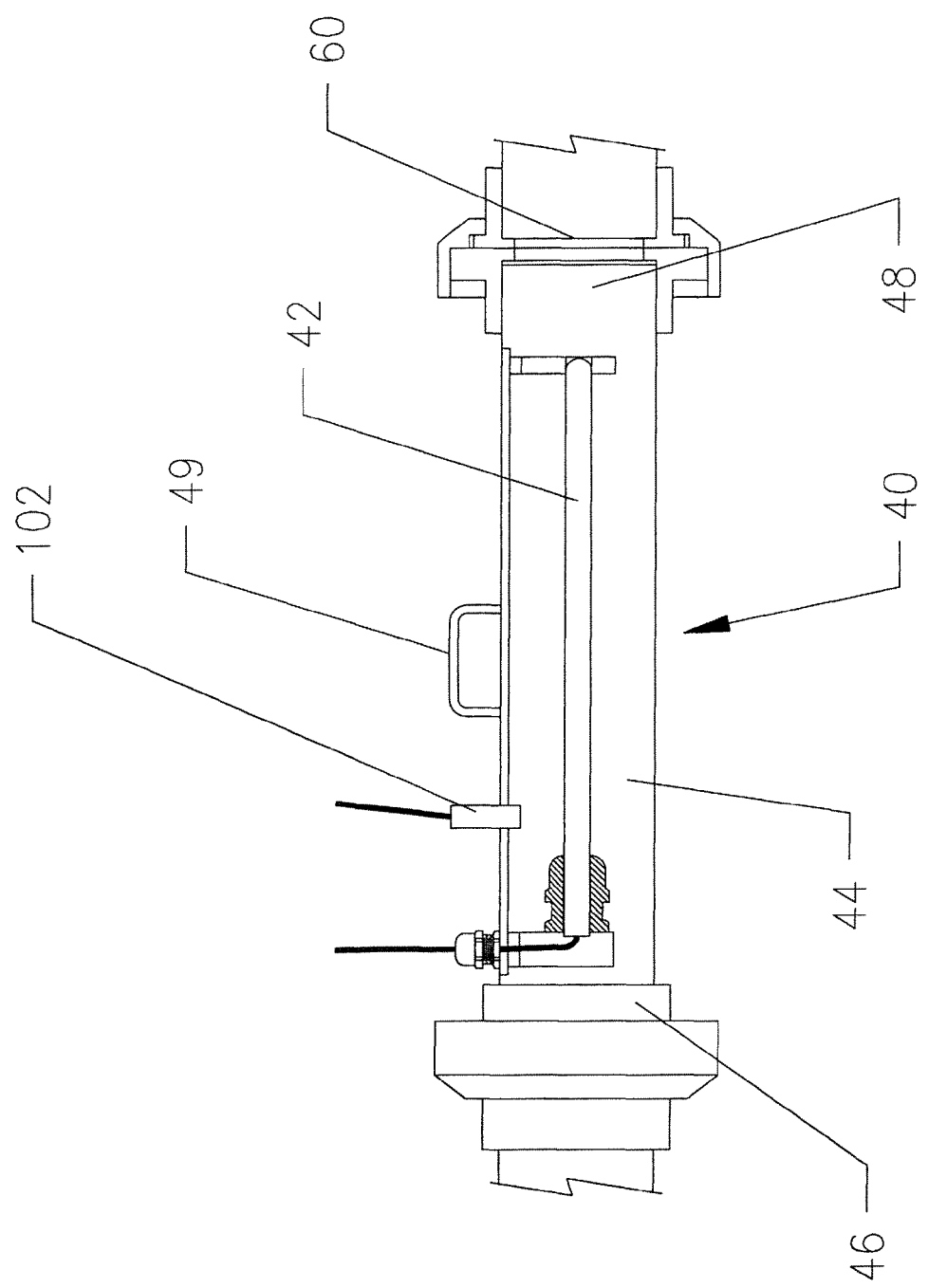
FIG. 6 is a side elevation view of a UV treatment device showing a top cover affixed to a UV treatment device housing according to multiple embodiments and alternatives.
Figure 7:
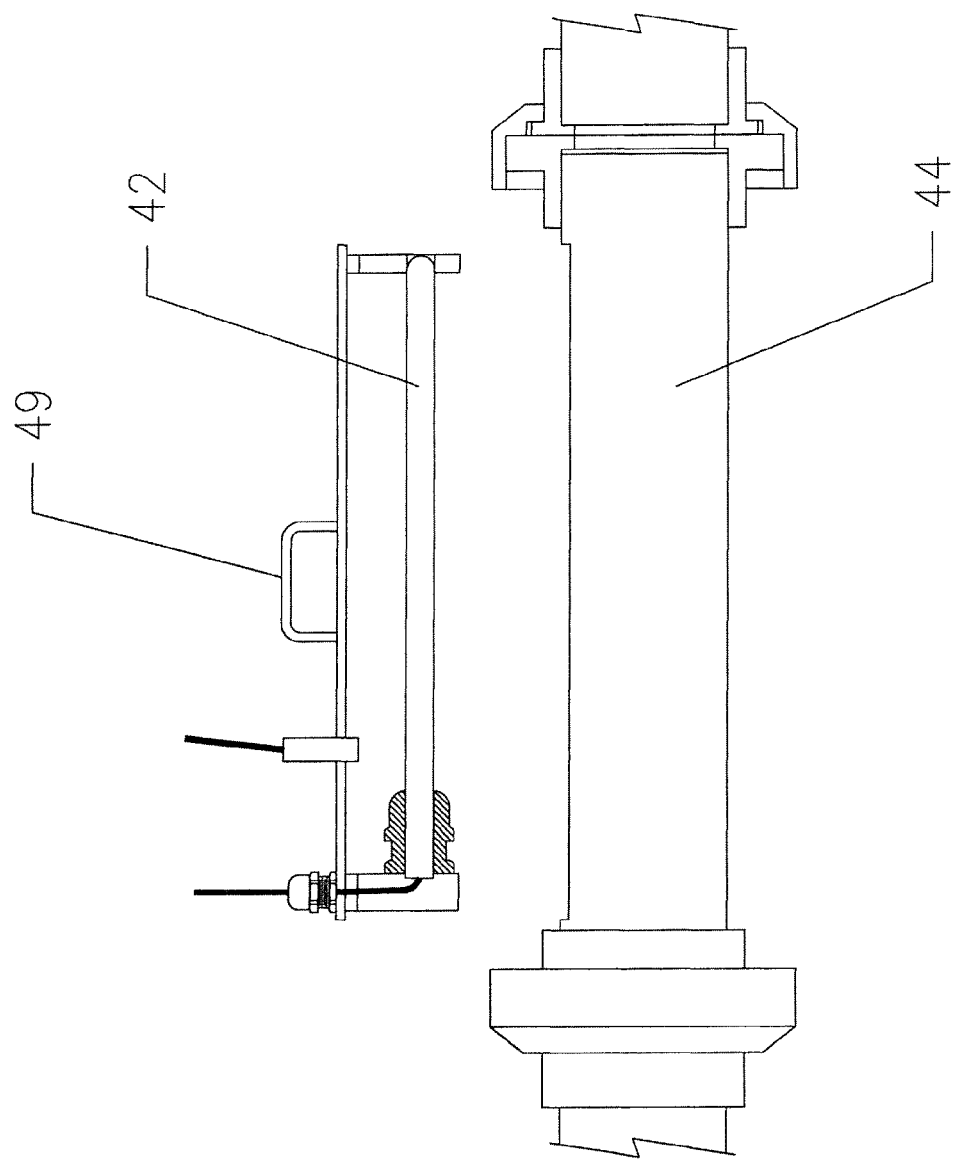
FIG. 7 is a side elevation view of a UV treatment device showing a top cover removed from a UV treatment device housing according to multiple embodiments and alternatives.

With reference to FIG. 6, the top cover 49 is removably affixed to the UV treatment device housing 44 in order to provide for easy access to the UV light source 42 thereby facilitating removal of the UV light source 42 for replacement or repair, as required, without disturbing the rest of the UV treatment device 40. The top cover 49 configuration also allows for access to the UV treatment device housing 44 for cleaning and repair. With reference to FIG. 7, multiple embodiments include those wherein the UV light source 42 is removably affixed to the top cover 49 such that removal of the top cover 49 from the UV treatment device housing 44 also removes the UV light source 42 from the UV treatment device housing 44.

Figure 14:
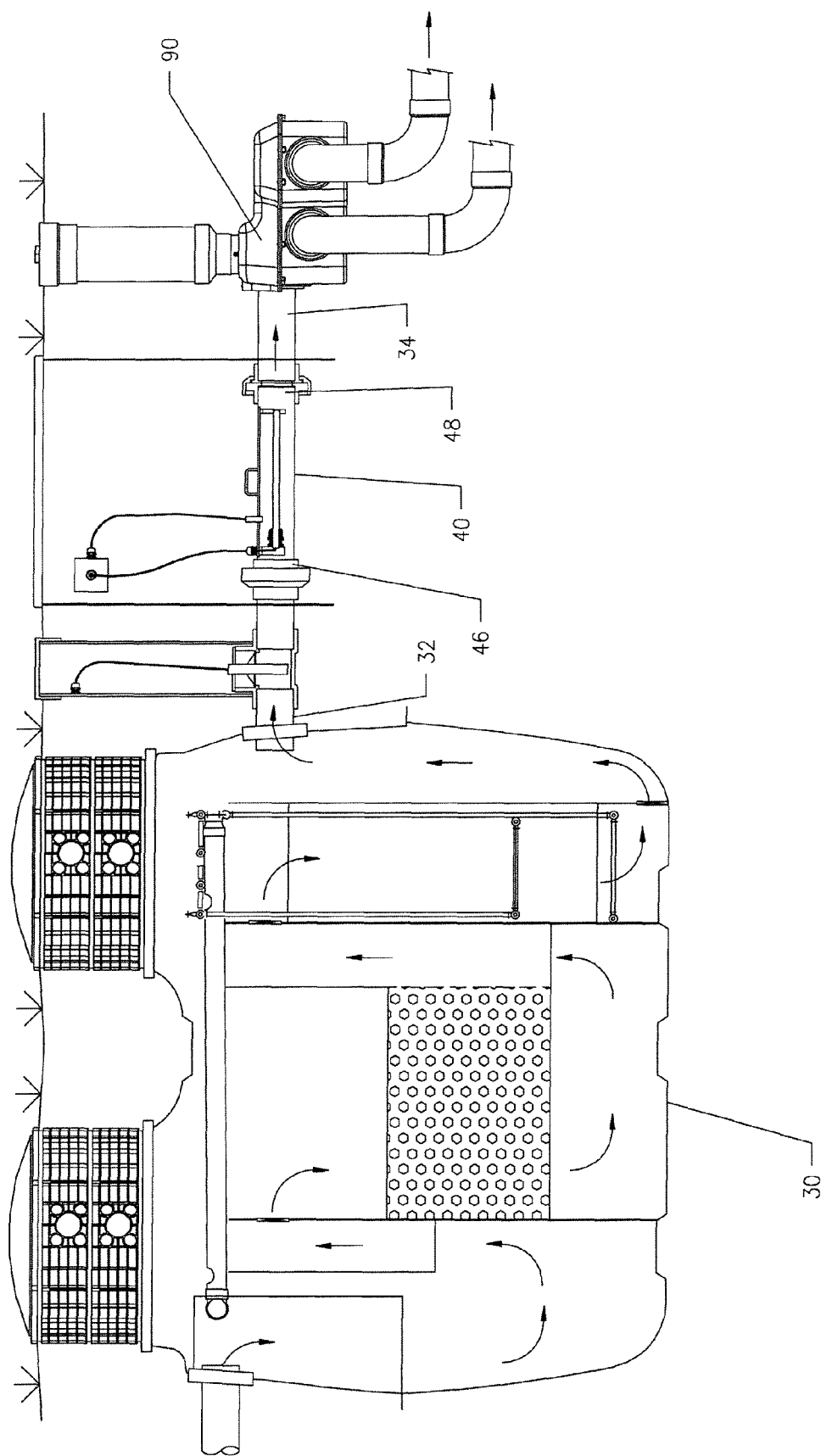
FIG. 14 is a side elevation view of a wastewater treatment system according to multiple embodiments and alternatives.
Figure 15:
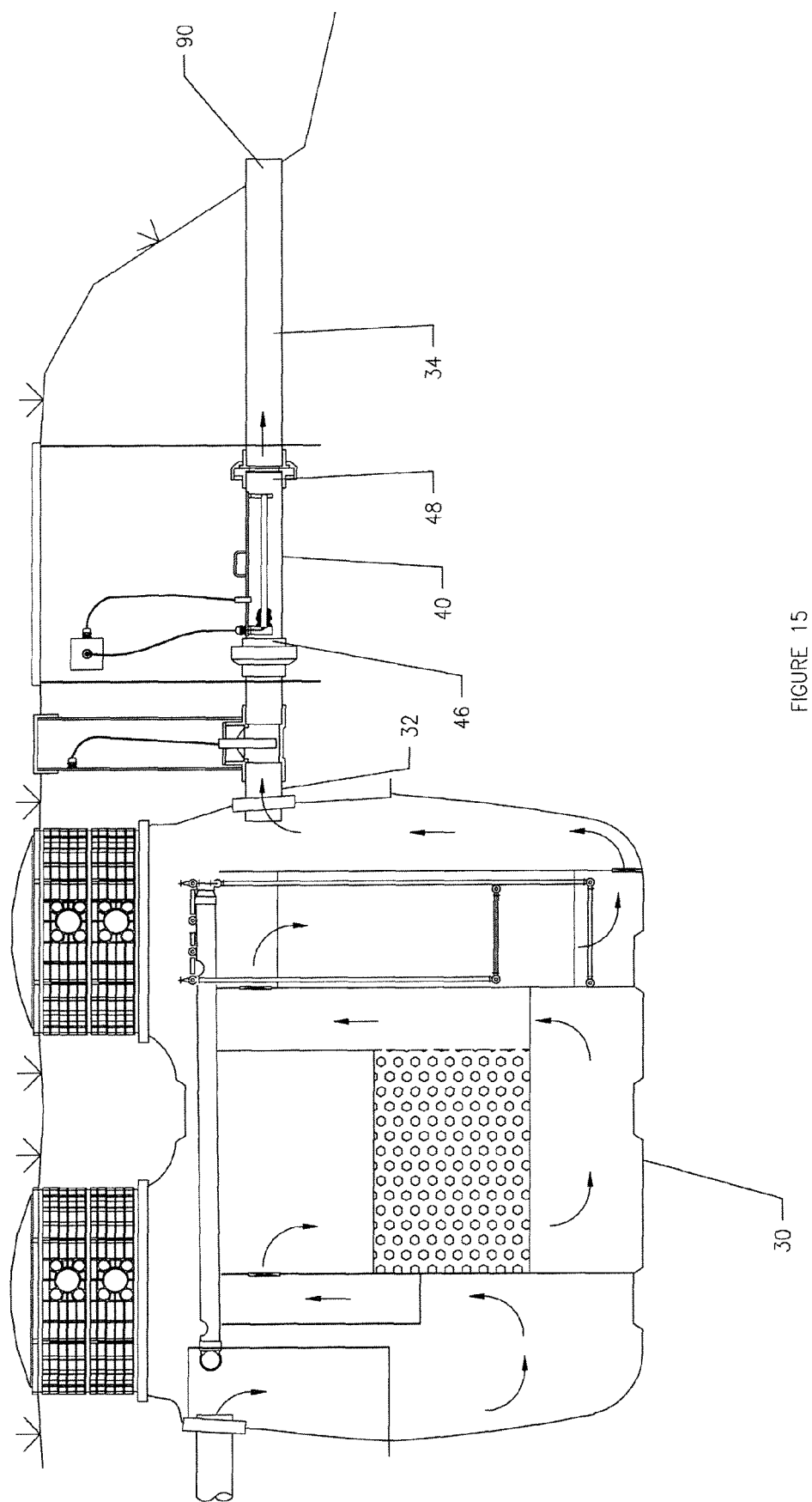
FIG. 15 is a side elevation view of a wastewater treatment system according to multiple embodiments and alternatives.

With reference back to FIG. 5, in multiple embodiments, the UV treatment device 40 is substantially horizontally oriented with respect to the ground. In some embodiments, the housing inlet 46 is in direct fluid communication with the discharge outlet 32 of the wastewater treatment device 30. Also, with reference to FIGS. 14 and 15, the effluent outlet 34 is in direct fluid communication, as desired, with any discharge piping system 90 resulting in discharge to the pump chamber 72 and any dissipation pathway post pump-chamber such as drip, low pressure pipe or spray through sprinkler heads, soil based dissipation area, or above grade surface gravity.

Figure 10:
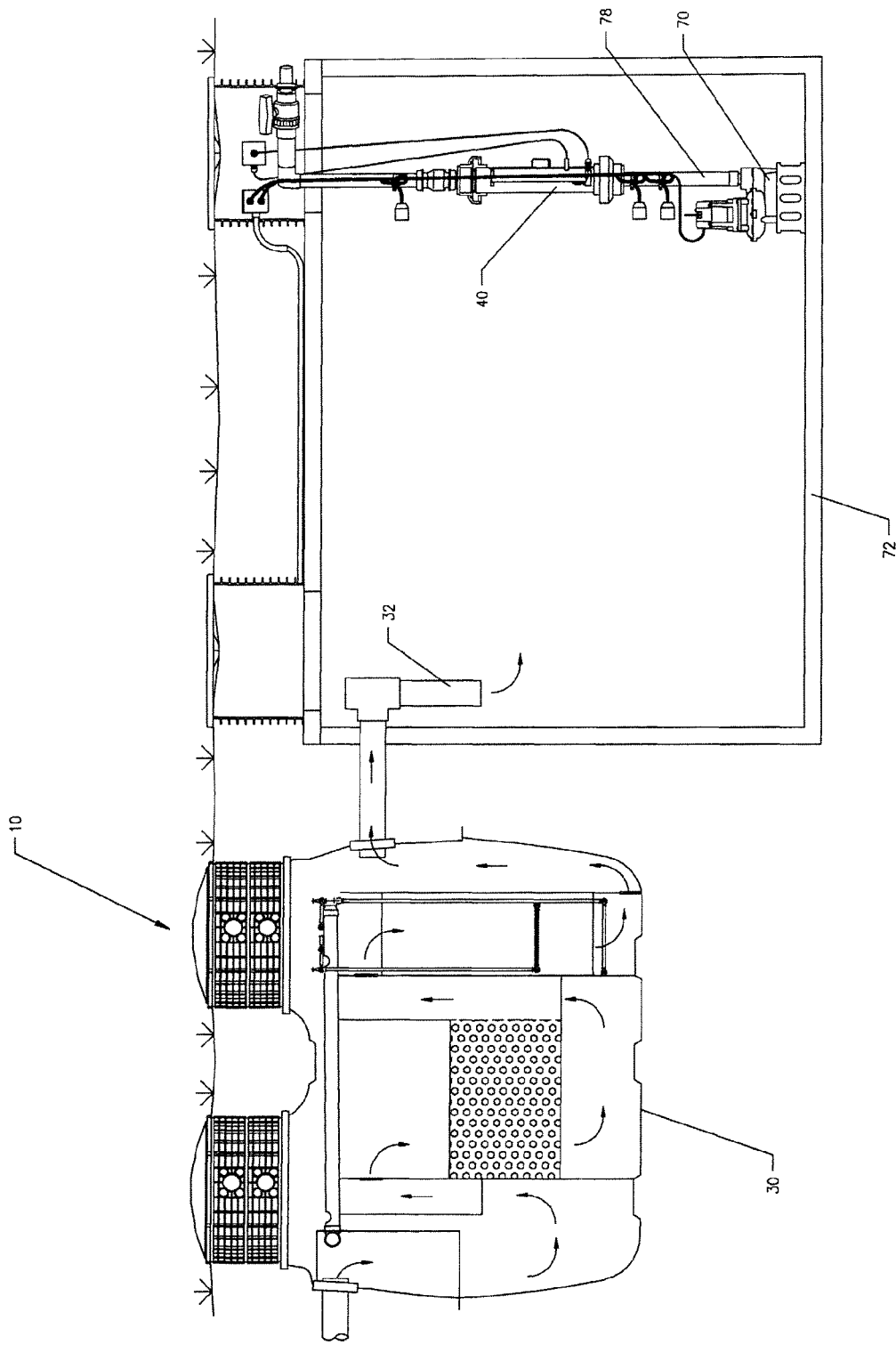
FIG. 10 is a side elevation view of a wastewater treatment system according to multiple embodiments and alternatives.
Figure 13:
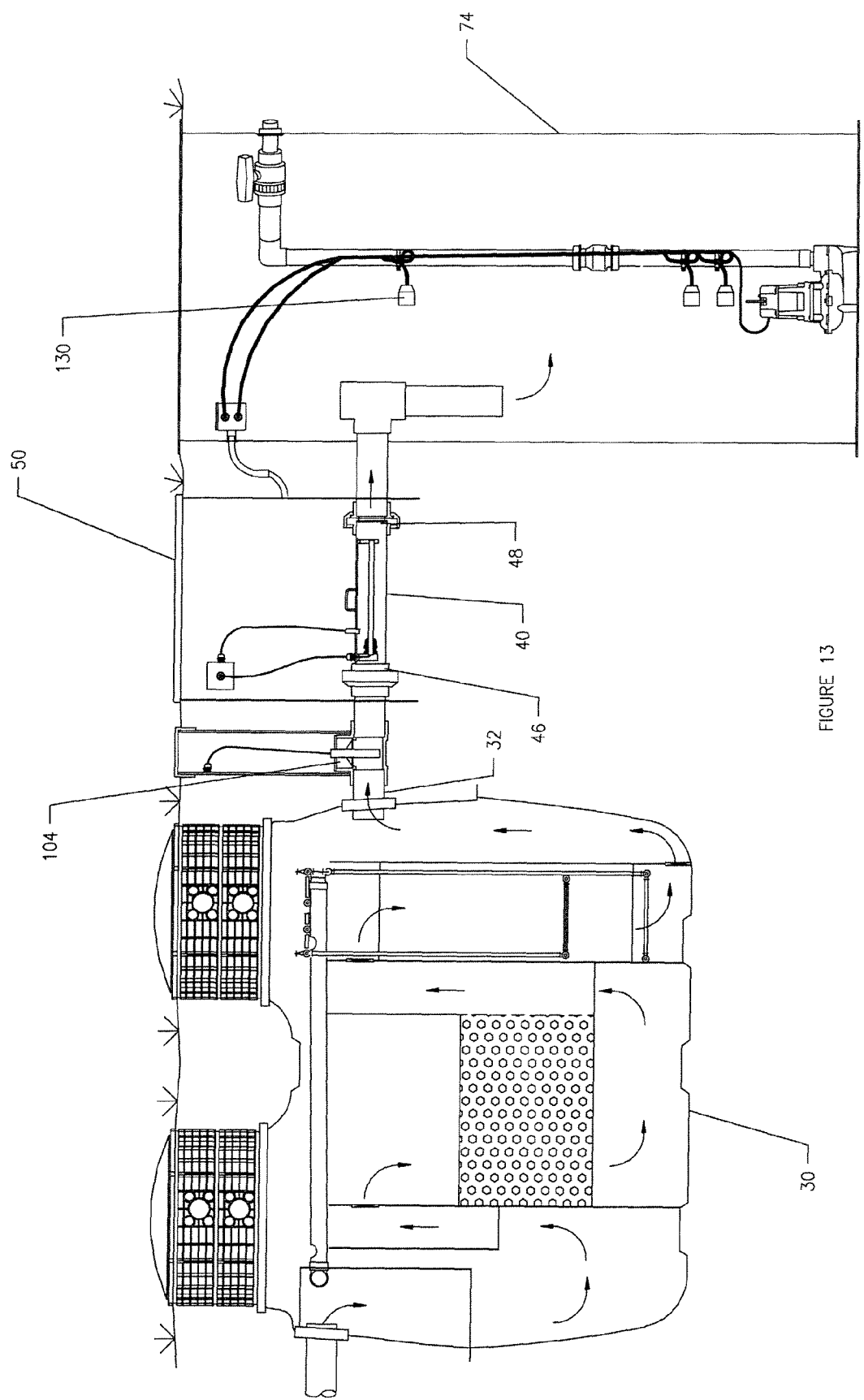
FIG. 13 is a side elevation view of a wastewater treatment system according to multiple embodiments and alternatives.

With reference to FIG. 10, as desired, a pump 70 is located within the pump chamber 72 or, with reference to FIG. 13, the pumping basin 74. Embodiments include those wherein the pump 70 has a pump discharge 78. In some embodiments, the UV treatment device 40 is located within the pump discharge 78. However, the UV treatment device 40 is located, as desired, at any position deemed suitable by the user.

In multiple embodiments and alternatives, the wastewater treatment device 30 is a Jokaso device. Alternatively, the wastewater treatment device 30 is any of a number of different devices that are commercially available as selectably chosen by the user including, but not limited to, an anaerobic treatment device, an aerobic treatment device or any other suitable type of treatment device. Multiple embodiments include those wherein the wastewater treatment device 30 performs both the functions of BOD and TSS removal and reduction. Alternatives include those wherein the wastewater treatment device 30 performs both primary treatment functions and secondary treatment functions.

In multiple embodiments and alternatives, the UV treatment device housing 44 is made of PVC. Alternatively, the UV treatment device housing 44 may have, as part of its composition, any of a number of different materials including, but not limited to, aluminum, copper, silver, stainless steel or any other suitable material. Alternatives include those wherein the UV treatment device housing 44 is tube shaped; however, the UV treatment device housing 44 is provided in other suitable shapes.

Figure 8:
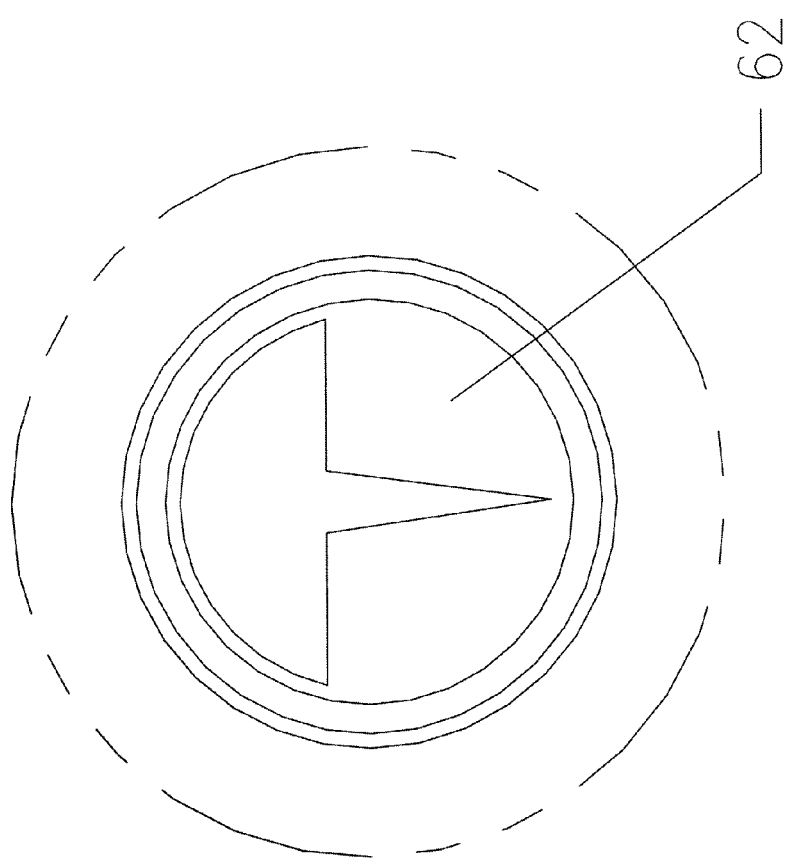
FIG. 8 is a plan view of a V-notch weir according to multiple embodiments and alternatives.
Figure 9:
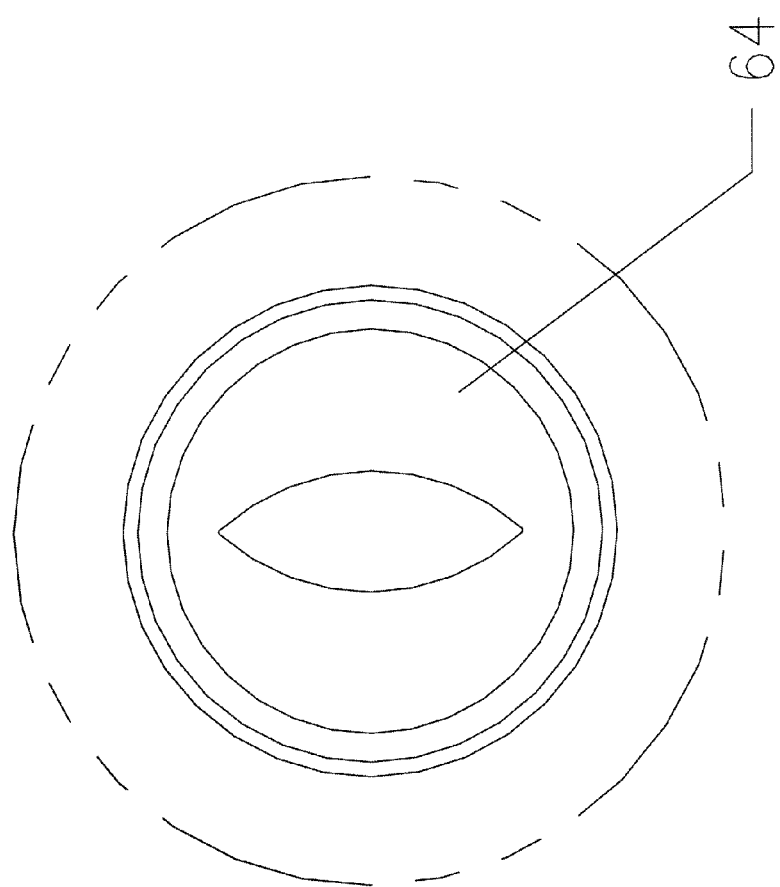
FIG. 9 is a plan view of a cat's eye weir according to multiple embodiments and alternatives.

In multiple embodiments and alternatives, the UV treatment device 40 includes a flow regulator device 60 disposed at the housing outlet 48. A function of the flow regulator device 60 in these embodiments and alternatives is to control the flow out of the UV treatment device 40. Alternatives include those wherein the flow regulator device 60 is disposed on the housing inlet 46. A function of the flow regulator device 60 in these alternatives is to control the flow through the UV treatment device 40. Multiple embodiments of the wastewater treatment system 10 include a flow regulator device 60 which comprises a weir 85, as shown generally in FIG. 4*a*. Alternatives include those wherein the weir 85 comprises a V-notch weir 62, as shown generally in FIG. 8. The V-notch weir 62 allows for free flow once the fluid reaches the limit of the V-notch weir 62. In multiple embodiments, this eliminates the problem of back up in the UV treatment device 40, as well as the wastewater treatment device 30. Other weirs 85 are used, as desired, such as a cat's eye weir 64, as shown in FIG. 9, or any other weir 85 deemed suitable by the user. Alternatives include those wherein the flow regulator device 60 comprises a comprises a hole 86, as shown generally in FIG. 4*b*, or a slit 87, as shown generally in FIG. 4*c*. Further, alternatives include those wherein the flow regulator device 60 comprises a ball valve 88, as shown generally in FIG. 4*d*. However, other flow regulator devices 60 are used, as desired, as deemed suitable by the user. As desired, the flow regulator device 60 is located at any point within the wastewater treatment system 10 deemed suitable by the user.

With reference to FIG. 3, multiple embodiments and alternatives of the wastewater treatment system 10 include a flow sensitive switch 100 that activates the UV light source 42 only when effluent (flow) is being produced. The switch 100 aids in extending the life of the UV light source 42 and in reducing the production of organic materials formed when the fluid is static. In some embodiments, the switch 100 is an LED light sensing flow mechanism 102 that is enabled to function as an on-off switch as shown in FIGS. 4 and 6. With reference to FIG. 5, in other embodiments, the switch 100 is a mechanical flow sensing device 104. As desired, the switch 100 is any other device deemed suitable by the user. Multiple embodiments include those wherein the switch 100 is located within the UV treatment device 40 at any point deemed suitable by the user or within the wastewater treatment device 30 at any point deemed suitable by the user. As desired, the wastewater treatment system includes both the LED light sensing flow mechanism 102 and the mechanical flow sensing device 104.

Figure 11:
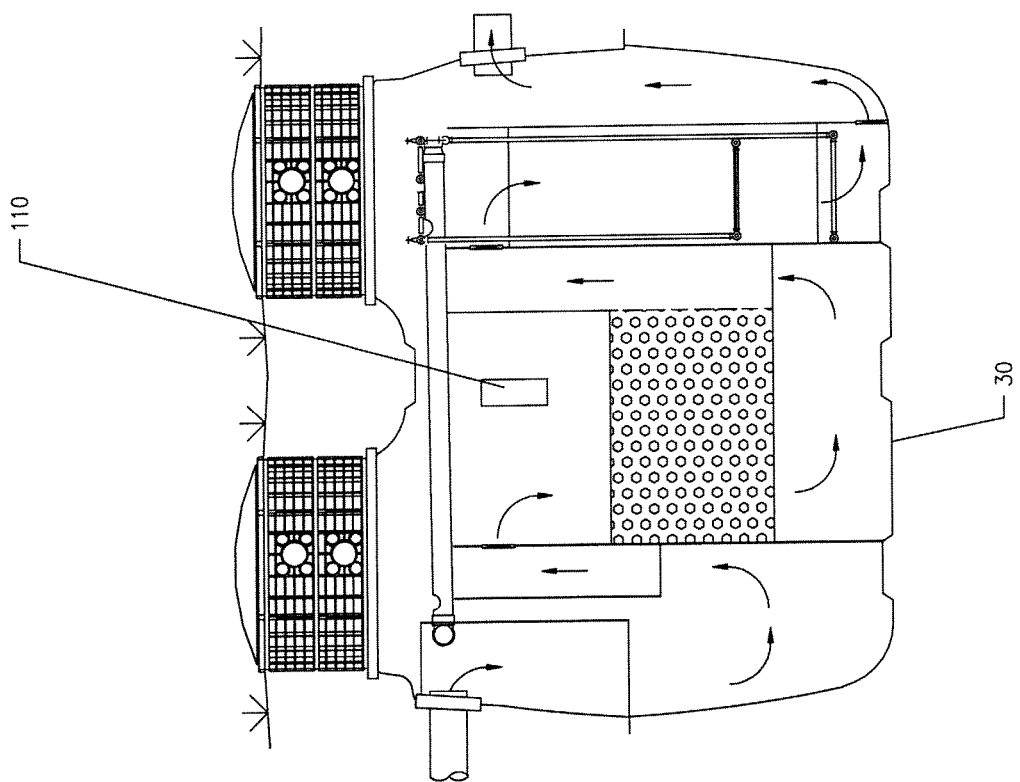
FIG. 11 is a side elevation view of a wastewater treatment system according to multiple embodiments and alternatives.

With reference to FIG. 11, in multiple embodiments and alternatives, a heater 110 is disposed within said wastewater treatment device 30. In some embodiments, the heater 110 functions to warm fluid as a static attached device. Embodiments include those wherein the heater 110 is able to circulate heated flow within the wastewater treatment system 10. As desired, the heater 110 is also able to perform other heating functions deemed desirable by the user.

Figure 12:
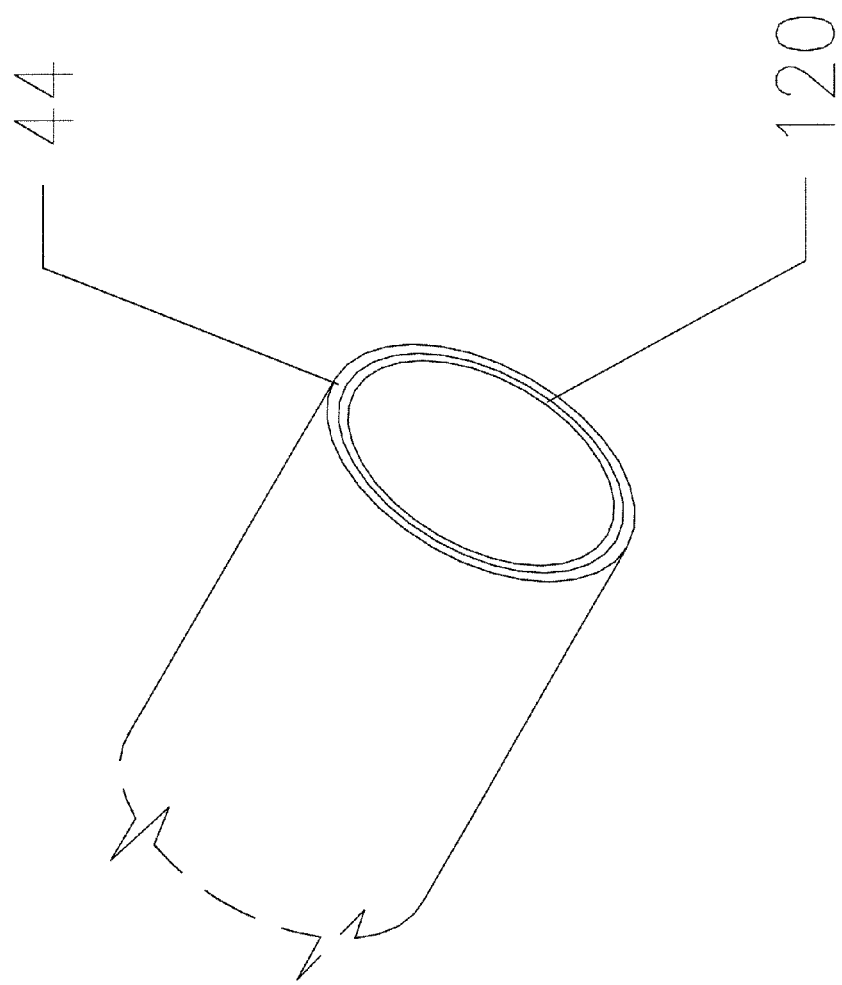
FIG. 12 is a perspective view of a UV treatment device showing active metals disposed on the inside surface of a UV treatment device housing according to multiple embodiments and alternatives.

With reference to FIG. 12, multiple embodiments and alternatives of the UV treatment device 40 include active metals 120 disposed on the inside surface of the UV treatment device housing 44 in communication with the fluid flow. The active metals 120 are silver, copper or any other suitable metal as selectably chosen by the user.

In multiple embodiments and alternatives, the wastewater treatment system 10 includes a fluid level alarm 130 as shown in FIGS. 3 and 5. Embodiments include those wherein the fluid level alarm 130 signals the presence of fluid at a level specified by the user in the UV treatment device housing 44 and those wherein the fluid level alarm 130 signals the presence of fluid at a level specified by the user in the pump chamber 72 or the pumping basin 74. However, the fluid level alarm 130 is used to signal, as desired, fluid at a level specified by the user at any point in the wastewater treatment system 10 as selectably chosen by the user.

With reference back to FIG. 1, multiple embodiments include a failure alarm 140 that warns of UV treatment device 40 failure. Multiple embodiments include those wherein the failure alarm 140 is electrically coupled to the UV treatment device 40. In some embodiments, the failure alarm 140 operates to notify the system operator that the UV light source 42 is no longer operational or that the UV light source 42 will soon be non-operational.

It will therefore be readily understood by those persons skilled in the art that the embodiments and alternatives of a UV Disinfection System are susceptible to a broad utility and application. While the embodiments are described in all currently foreseeable alternatives, there may be other, unforeseeable embodiments and alternatives, as well as variations, modifications and equivalent arrangements that do not depart from the substance or scope of the embodiments. The foregoing disclosure is not intended to be construed to limit the embodiments or otherwise to exclude such other embodiments, adaptations, variations, modifications and equivalent arrangements, the embodiments being limited only by the claims appended hereto and the equivalents thereof.

We claim:

1. A wastewater treatment system comprising:
    a wastewater treatment device having a wastewater outlet, the wastewater outlet being contained substantially within said wastewater treatment device; and
    a UV treatment device;
    the UV treatment device further comprising:
        a UV light source,
        a UV treatment device housing,
        a housing inlet,
        and a housing outlet;
    said UV treatment device being contained substantially within said wastewater treatment device, wherein said housing outlet of the UV treatment device is also the wastewater outlet for said wastewater treatment device, and wherein said wastewater treatment system is configured to provide at least tertiary wastewater treatment within the system;
    said UV treatment device housing being substantially vertically oriented with respect to the ground and extending downward from said housing outlet;
    said housing inlet being disposed on said UV treatment device housing deeper in the vertical plane than said housing outlet;
    said UV light source being substantially contained within said UV treatment device housing;
    wherein said housing inlet comprises an opening for facilitating the entry of fluid and for allowing solids to fall out of said UV treatment device housing;
    and substantially all flow exiting said wastewater treatment device passing through said housing outlet.

2. The wastewater treatment system of claim 1 wherein said wastewater treatment device performs the functions of (1) biochemical oxygen demand removal and reduction and (2) total suspended solids removal and reduction.

3. The wastewater treatment system of claim 1 wherein said UV treatment device further comprises a flow regulator device wherein said flow regulator device is disposed on said housing outlet such that said flow regulator device controls the flow out of both of said UV treatment device and said wastewater treatment device in order to retain effluent within the UV treatment device housing.

4. The wastewater treatment system of claim 3 wherein said flow regulator device is chosen from the group: weir, hole, slit and ball valve.

5. The wastewater treatment system of claim 4 wherein said weir is chosen from the group: V-notch weir and cat's eye weir.

6. The wastewater treatment system of claim 1 wherein said UV treatment device further comprises a switch wherein said switch is disposed within said wastewater treatment device and said switch that activates said UV light source only when effluent is being produced.

7. The wastewater treatment system of claim 6 wherein said switch is an LED light sensing flow mechanism enabled to function as an on-off switch.

8. The wastewater treatment system of claim 6 wherein said switch is a mechanical flow sensing device.

9. The wastewater treatment system of claim 1 further comprising a heater wherein said heater is disposed within said wastewater treatment device.

10. The wastewater treatment system of claim 9 wherein said heater is a static attached device able to warm fluid.

11. The wastewater treatment system of claim 9 wherein said heater is able to circulate flow within the wastewater treatment system.

12. The wastewater treatment system of claim 1 further comprising active metals, wherein said active metals are disposed on the inside surface of said UV treatment device housing.

13. The wastewater treatment system of claim 12 wherein said active metals are chosen from the group: silver and copper.

14. The wastewater treatment system of claim 1 further comprising a fluid level alarm.

15. The wastewater treatment system of claim 1 further comprising a failure alarm wherein said failure alarm is electrically coupled to said UV treatment device and said failure alarm warns of UV treatment device failure.

16. A UV treatment device for a wastewater treatment system comprising:
   a UV treatment device housing;
   a UV light source;
   a housing inlet;
   a housing outlet;
   and active metals;
   wherein said UV light source is substantially contained within said UV treatment device housing;
   said housing inlet is disposed on said UV treatment device housing such that said housing inlet allows fluid to enter said UV treatment device housing;
   said housing outlet is disposed on said UV treatment device housing such that said housing outlet allows fluid to exit said UV treatment device housing,
   wherein the wastewater treatment system comprises a wastewater treatment device having a wastewater outlet, the wastewater outlet being contained substantially within said wastewater treatment device, and said housing outlet of the UV treatment device is also the wastewater outlet for the wastewater treatment device;
   the wastewater treatment system being configured to provide at least wastewater treatment within the system;
   and said active metals are disposed on the inside surface of said UV treatment device housing.

17. The UV treatment device of claim 16 wherein said active metals are chosen from the group: silver and copper.

18. A wastewater treatment system, comprising:
   a wastewater treatment device having a wastewater outlet; and
   a UV treatment device having a housing, the housing having:
      a UV light source positioned therein;
      an inlet permitting the entry of fluids therein; and
      an outlet permitting the output of fluids therefrom;
   wherein said UV treatment device is contained substantially within said wastewater treatment device, such that the outlet of the UV treatment device and the wastewater outlet of the wastewater treatment device are the same outlet, which is contained substantially within said wastewater treatment device;
   wherein said UV treatment device is in fluid communication with said wastewater treatment device and said wastewater treatment device is positioned to feed treated wastewater into said UV treatment device for disinfection, and wherein substantially all flow exiting said wastewater treatment device passes through said housing outlet of the UV treatment device, and the wastewater treatment system is configured to provide at least tertiary wastewater treatment within the system.

19. The wastewater treatment device of claim 18, wherein said UV treatment device is positioned so that all flow exiting said wastewater treatment device must pass through the outlet of said UV treatment device.

20. The wastewater treatment system of claim 19, wherein said UV treatment device further comprises a flow regulator device disposed on the outlet of said UV treatment device such that said flow regulator device controls the flow out of both of said UV treatment device and said wastewater treatment device in order to retain effluent within the UV treatment device housing.

21. The wastewater treatment system of claim 20, wherein said flow regulator device is chosen from the group: weir, hole, slit and ball valve.

22. The wastewater treatment system of claim 21, wherein said weir is chosen from the group: V-notch weir and cat's eye weir.

23. The wastewater treatment device of claim 18, wherein the housing of said UV treatment device is oriented substantially vertically.

24. The wastewater treatment device of claim 23, wherein the outlet of said UV treatment device is positioned above the inlet of said UV treatment device to permit solids to fall out of said UV treatment device.

25. The wastewater treatment system of claim 18, wherein said wastewater treatment device performs the functions of (1) biochemical oxygen demand removal and reduction and (2) total suspended solids removal and reduction.

26. The wastewater treatment system of claim 18, further comprising a switch configured to activate said UV light source only when effluent is being produced.

27. The wastewater treatment system of claim 26, wherein said switch is positioned within said wastewater treatment device.

28. The wastewater treatment system of claim 26, wherein said switch includes a mechanical flow sensing device.

29. The wastewater treatment system of claim 18, further comprising a heater disposed within said wastewater treatment device.

30. The wastewater treatment system of claim 29, wherein said heater is able to circulate flow within the wastewater treatment system.

31. The wastewater treatment system of claim 18, further comprising active metals disposed on the inside surface of the housing of said UV treatment device.

32. The wastewater treatment system of claim 31, wherein said active metals are chosen from the group: silver and copper.

33. The wastewater treatment system of claim 18, further comprising a fluid level alarm.

34. The wastewater treatment system of claim 18, further comprising a failure alarm electrically coupled to said UV treatment device configured to warn of UV treatment device failure.

* * * * *